United States Patent
Bertness et al.

(10) Patent No.: US 6,805,090 B2
(45) Date of Patent: Oct. 19, 2004

(54) CHARGE CONTROL SYSTEM FOR A VEHICLE BATTERY

(75) Inventors: Kevin I. Bertness, Batavia, IL (US); James K. Klang, Downers Grove, IL (US); Michael Cox, Chicago, IL (US)

(73) Assignee: Midtronics, Inc., Willowbrook, IL (US)

( * ) Notice: Subject to any disclaimer, the term of this patent is extended or adjusted under 35 U.S.C. 154(b) by 139 days.

(21) Appl. No.: 10/112,105

(22) Filed: Mar. 28, 2002

(65) Prior Publication Data

US 2003/0183191 A1 Oct. 2, 2003

(51) Int. Cl.[7] ................................................. B60K 6/04
(52) U.S. Cl. ................................................. 123/198 R
(58) Field of Search ........................ 123/198 D, 198 R; 62/323.1; 307/10 R

(56) References Cited

U.S. PATENT DOCUMENTS 4,160,916 A * 7/1979 Papasideris .............. 123/198 D
4,280,457 A * 7/1981 Bloxham ................. 123/198 D
6,356,042 B1   3/2002 Kahlon et al. ............... 318/128

FOREIGN PATENT DOCUMENTS

GB            2 246 916 A         12/1992

* cited by examiner

Primary Examiner—Henry C. Yuen
Assistant Examiner—Jason Benton
(74) Attorney, Agent, or Firm—Westman, Champlin & Kelly

(57) ABSTRACT

A system for controlling charging of a battery of a vehicle powered by an internal combustion engine. The system includes an input that receives an engine shutdown signal indicative that the engine will be shut down during an idle period to thereby conserve fuel. An engine shutdown delay delays shutdown of the engine for a shutdown delay period in response to the engine shutdown signal. Charge boost circuitry increases a charge signal applied to the battery of the vehicle during the engine shutdown delay period.

42 Claims, 5 Drawing Sheets

CHARGE CONTROL SYSTEM FOR A VEHICLE BATTERY

BACKGROUND OF THE INVENTION

The present invention relates to automotive vehicles. More specifically, the present invention relates to a system for controlling the charging of a vehicle battery.

Automotive vehicles powered by combustion engines typically include a rechargeable battery. The battery is used to provide cranking power to start the vehicle and also is the only source of power to continue to maintain the lights or other devices in operation when the vehicle ignition has been turned off. When the vehicle is running, the engine is used to charge the battery. Additionally, the engine is also used to power electrical components of the vehicle when the engine is running.

Vehicles contain charging systems, simply referred to as an "alternator," which are powered by the engine and used to charge the battery. Typical charging systems include a simple voltage regulator connected to the output of an alternator. The voltage regulator is used to set a voltage generated by the alternator which is applied to the battery.

In the automotive industry, the drive towards greater fuel efficiency and lower exhaust-gas emissions has led to the development of "start-stop" vehicles in which the vehicle engine shuts off at stop lights, traffic jams, etc., and restarts automatically when the driver steps on the accelerator pedal. Frequent shutting off of the engine in such vehicles prevents the alternator from charging the battery evenly. Thus, the battery charge can deplete relatively fast in such start-stop vehicles. Further, a typical alternator is not designed to fully restore a depleted battery, but rather to maintain a healthy one. Thus, it is possible for a start-stop vehicle, that employs a prior art charging system, to automatically shut off at a stop light or traffic jam and not be able to start again until the depleted vehicle battery is boosted from a booster battery or the vehicle is jump started by another vehicle.

SUMMARY OF THE INVENTION

A system for controlling charging of a battery of a vehicle powered by an internal combustion engine is provided. The system includes an input that receives an engine shutdown signal indicative that the engine will be shut down during an idle period to thereby conserve fuel. An engine shutdown delay delays shutdown of the engine for a shutdown delay period in response to the engine shutdown signal. Charge boost circuitry increases a charge signal applied to the battery of the vehicle during the engine shutdown delay period.

DETAILED DESCRIPTION OF THE PREFERRED EMBODIMENTS

Figure 1:
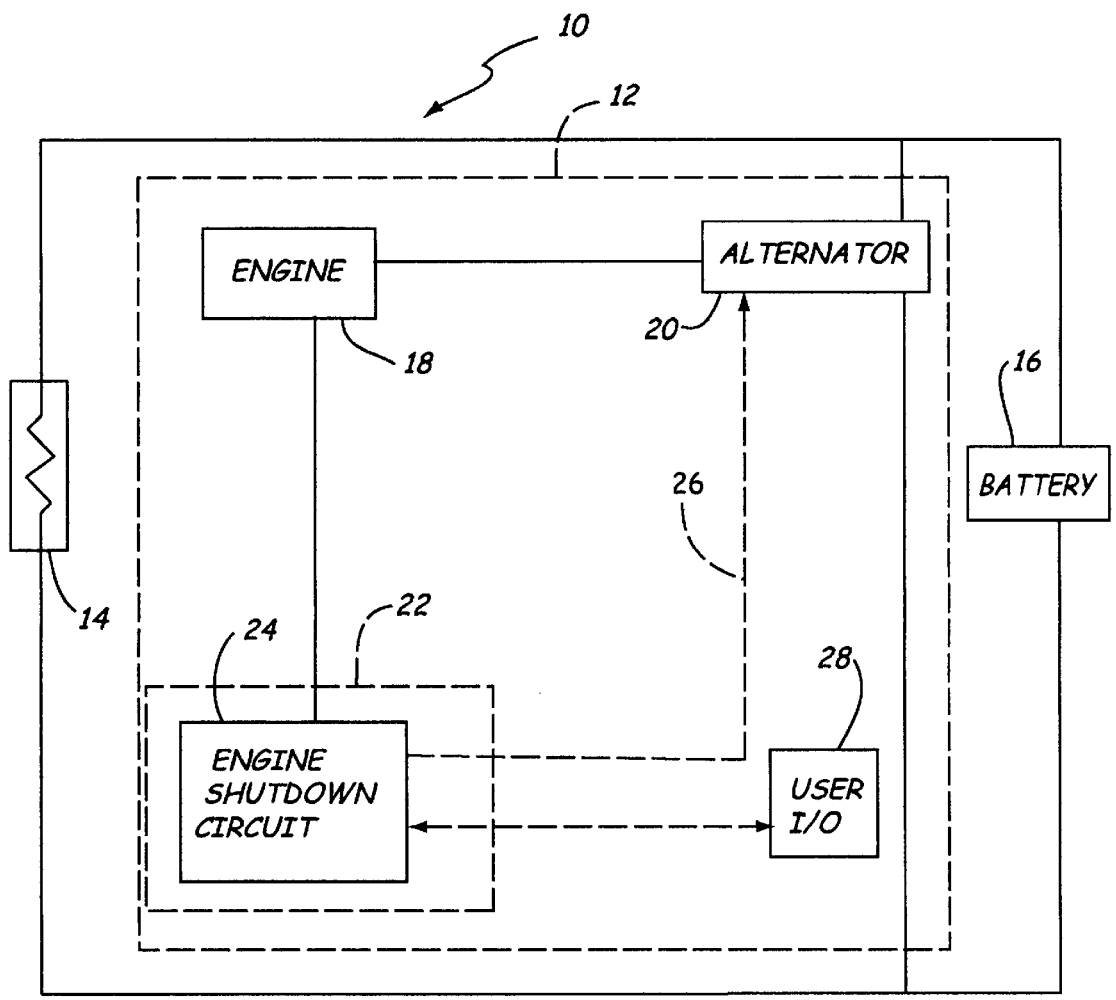
FIG. 1 is a simplified block diagram showing a system for controlling the charging of a battery in a vehicle in accordance with an embodiment of the present invention.

FIG. 1 is a simplified block diagram showing an automotive vehicle 10 which includes a battery charge control system 12 in accordance with one embodiment of the present invention. Vehicle 10 includes vehicle loads 14 which are shown schematically as an electrical resistance. A battery 16 is coupled to the vehicle load 14 and to charge control system 12. As can be seen in FIG. 1, system 12 includes an internal combustion engine 18, an alternator 20 and an engine shutdown circuit 24, which is typically part of an engine start-stop system 22. Engine 18, that powers vehicle 10, couples to alternator 20, which is utilized to charge battery 16 and to provide power to loads 14 during operation. Engine shutdown circuit 24 automatically shuts down engine 18 when one or more predetermined conditions are fulfilled, for example, when the vehicle speed is zero miles per hour and the accelerator pedal is not stepped on. Fulfillment of the one or more conditions is indicative of the vehicle being in an idle state, and an idle period can be defined as a period of time during which the vehicle is in an idle state.

A standard vehicle alternator or generator system typically includes a three-phase AC alternator having a rotor coupled to the engine by a belt or a shaft and a stator that includes three windings distributed around it. The alternator also includes rectification diodes and a voltage regulator. The output of the alternator is dependent upon the speed of the rotor, the magnitude of the current supplied to the field windings of the rotor, etc. The voltage regulator typically controls the output of the alternator by controlling the amount of current supplied to the field windings of the rotor. The voltage regulator is configured such that the alternator output is between 13.5 and 15.5 volts, depending upon the vehicle manufacturer and particular battery chemistry.

When such standard generator systems are employed in start-stop vehicles, no additional charge is provided to the battery to compensate for interruptions in charging of the battery each time the engine is shut off.

One aspect of the present invention includes the recognition of the aforementioned problem associated with prior art battery charging systems employed in start-stop vehicles. In one aspect of the present invention, just prior to shutting down engine 18, engine shutdown circuit 24 provides a shutdown control signal, via control line 26, to alternator 20. In response to this shutdown control signal, alternator 20 increases the charging signal provided to battery 16 in order to increase the ability of battery 16 to crank the engine for subsequent starting of the vehicle 10. The control just prior to shutdown can be by simply adjusting a potentiometer of a voltage regulator of alternator 20 to increase the magnitude of current supplied to field windings of a rotor of alternator 20. The output of alternator 20 is increased preferably only for a very short period of time, after which engine 18 is shutdown by circuit 24.

Figure 2:
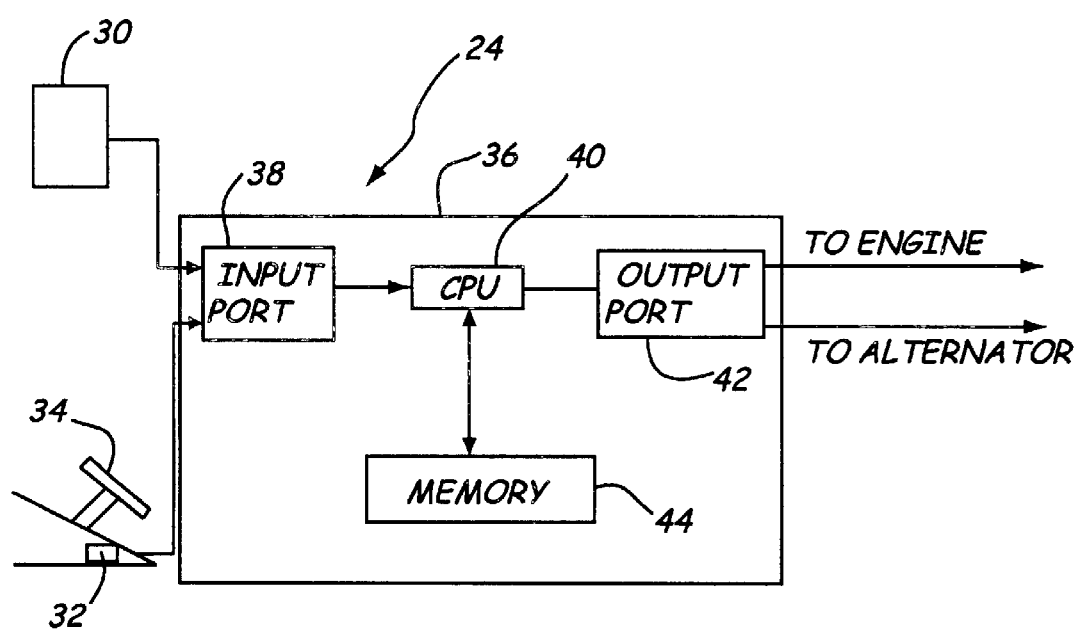
FIG. 2 is a simplified block diagram of a vehicle engine shutdown system.

Components of engine shutdown circuit 24 are illustrated in a very simplified block diagram shown in FIG. 2. Engine shutdown circuit 24 includes a car speed sensor 30, an idle position switch 32 that is located below accelerator pedal 34 and a controller 36. Idle position switch 32 detects whether or not accelerator pedal 34 is stepped on by a driver. Controller 36 includes an input port 38 for receiving output signals of sensor 30 and idling switch 32. Controller 36 also includes central processing unit (CPU) 40, which receives output signals from input port 38 and carries out data processing on the basis of control programs stored in memory 44. When CPU 40 determines that one or more engine stop conditions are fulfilled, it provides an output to output port 42, which provides control signals for increasing the output of alternator 20 and for subsequently shutting down engine 18. As mentioned above, engine shutdown circuit 24 is typically a part of engine start-stop system 22. Thus, controller 36 can control both starting and stopping of engine 18. Engine shutdown circuit 24 also includes user input/output (I/O) 28 (shown in FIG. 1) for interaction with a vehicle operator. User I/O 28 is a means for the vehicle operator to provide a request for shutting down the engine. Further, user I/O 28 can provide a visual display that indicates to the operator that the vehicle is being automatically shut down.

Figure 3:
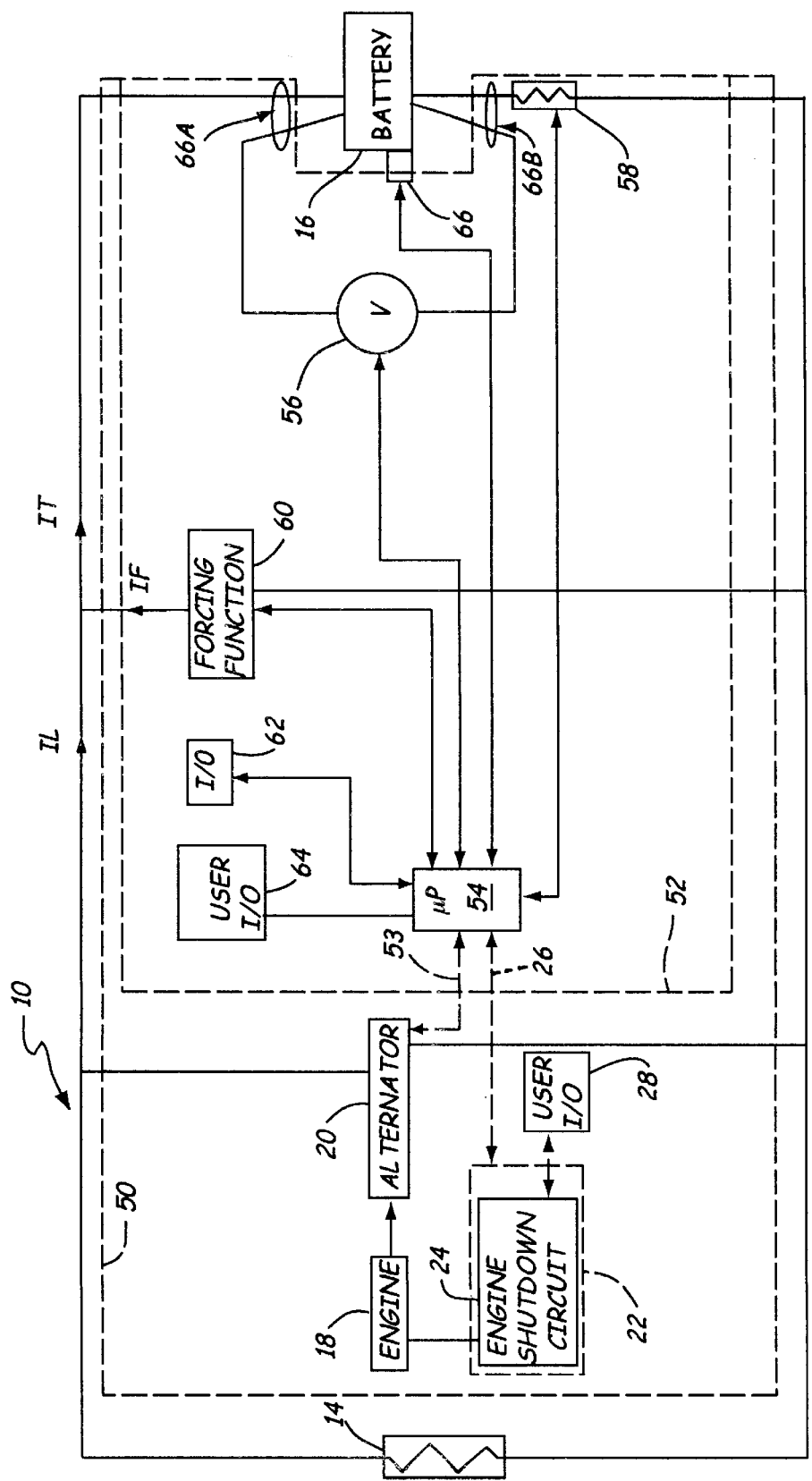
FIG. 3 is a simplified block diagram showing a system for controlling the charging of a battery in a vehicle in accordance with an embodiment of the present invention.

FIG. 3 illustrates a simplified block diagram showing a system for controlling the charging of a battery in a vehicle in accordance with another embodiment of the present invention. The same reference numerals are used to represent the same or similar elements of battery charge control systems 12 (FIG. 1) and 50 (FIG. 3). Other than the inclusion of battery monitor circuit 52 in battery charge control system 50 (FIG. 3), the remaining elements of FIG. 3 are similar to the elements of FIG. 1. In battery charge control system 50 of FIG. 3, instead of providing the shutdown control signal directly to alternator 20 from shutdown circuit 24 as shown in battery charge control system 12 (FIG. 1), the shutdown control signal is provided to a battery monitor circuit 52, which provides an alternator control signal over control line 53 to alternator 20. Details of the components of battery monitor circuit 52 and its operation in conjunction with engine shutdown circuit 24 are provided below.

As can be seen in FIG. 3, battery monitor 52, of battery charge control system 50, includes a microprocessor 54 coupled to a voltage sensor 56, a current sensor 58 and a forcing function 60. Microprocessor 54 may also include one or more inputs and outputs illustrated as I/O 62 adapted to couple to an external data bus or to an internal data bus associated with the vehicle 10. Further, a user I/O 64 is provided for interaction with a vehicle operator. Microprocessor 54 is coupled to engine shutdown circuit 24 and to alternator 20 and provides a control signal to alternator 20 in response to inputs, alone or in various functional combinations from current sensor 58, voltage sensor 56, forcing function 60 and engine shutdown circuit 24. Thus, the alternator control signal provided by microprocessor 54 controls the output of alternator 20 both during normal vehicle operation and also just prior to shutdown of engine 18. As mentioned above, the output of alternator 20 can be controlled by adjusting a potentiometer of a voltage regulator of the alternator 20 to control the current supplied to the alternator rotor field winding. In one embodiment, in response to receiving an engine shutdown signal from circuit 24, microprocessor 54 provides a battery-condition signal instructing circuit 24 to either proceed with shutting down engine 18 or to continue to keep engine 18 running as it has determined that battery 16 will not be able to start the engine after shutdown. In one embodiment, microprocessor 54 can raise the output voltage from alternator 20 in accordance with an inverse relationship to the state of charge of battery 16 during normal vehicle operation. This can be configured such that alternator 20 only charges battery 16 when necessary and only as much as is necessary during normal vehicle operation and "boost" charges battery 16 just prior to engine shutdown in response to an engine shutdown signal from circuit 24. This charging technique can increase battery life, lower component temperature of loads 14, increase the life span of loads 14, save fuel and help ensure that battery 16 has sufficient charge to crank engine 18 for restarting after shutdown.

FIG. 3 also illustrates a Kelvin connection formed by connections 66A and 66B to battery 16. With such a Kelvin connection, two couplings are provided to the positive and negative terminals of battery 16. This allows one of the electrical connections on each side of the battery to carry large amounts of current while the other pair of connections can be used to obtain accurate voltage readings. Because substantially no current is flowing through the voltage sensor 56, there will be little voltage dropped through the electrical connection between sensor 56 and battery 16 thereby providing more accurate voltage measurements In one particular embodiment, the combination of the Kelvin connection formed by connections 66A and 66B along with a separate current sensor 58 connected in series with the electrical system of the vehicle 10 is provided and allows monitoring of the condition of battery 16 during normal operation of vehicle 10 and just prior to engine shutdown, when the charging signal provided by alternator 20 is increased. Current sensor 58 is used to provide a monitor of the total current $I_T$ flowing through battery 16.

In operation, microprocessor 54 is capable of measuring a dynamic parameter of battery 16. As used herein, a dynamic parameter includes any parameter of battery 16 which is measured as a function of a signal having an AC or transient component. Examples of dynamic parameters include dynamic resistance, conductance, admittance, impedance or their combinations. In various aspects of the invention, this measurement can be correlated, either alone or in combination with other measurements or inputs received by microprocessor 54, to the condition or status of battery 16. This correlation can be through testing of various batteries and may be through the use of a lookup table or a functional relationship such as a characterization curve. The relationship can also be adjusted based upon battery construction, type, size or other parameters of battery 16. Examples of various testing techniques are described in the following references which are incorporated herein by reference. U.S. Pat. No. 3,873,911, issued Mar. 25, 1975, to Champlin, entitled ELECTRONIC BATTERY TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; U.S. Pat. No. 5,343,380, issued Aug. 30, 1994, entitled METHOD AND APPARATUS FOR SUPPRESSING TIME VARYING SIGNALS IN BATTERIES UNDERGOING CHARGING OR DISCHARGING; U.S. Pat. No. 5,572,136, issued Nov. 5, 1995, entitled ELECTRONIC BATTERY TESTER WITH AUTOMATIC COMPENSATION FOR LOW STATE-OF-CHARGE; U.S. Pat. No. 5,574,355, issued Nov. 12, 1996, entitled METHOD AND APPARATUS FOR DETECTION AND CONTROL OF THERMAL RUNAWAY IN A BATTERY UNDER CHARGE; U.S. Pat.

No. 5,585,416, issued Dec. 10, 1996, entitled APPARATUS AND METHOD FOR STEP-CHARGING BATTERIES TO OPTIMIZE CHARGE ACCEPTANCE; U.S. Pat. No. 5,585,728, issued Dec. 17, 1996, entitled ELECTRONIC BATTERY TESTER WITH AUTOMATIC COMPENSATION FOR LOW STATE-OF-CHARGE; U.S. Pat. No. 5,589,757, issued Dec. 31, 1996, entitled APPARATUS AND METHOD FOR STEP-CHARGING BATTERIES TO OPTIMIZE CHARGE ACCEPTANCE; U.S. Pat. No. 5,592,093, issued Jan. 7, 1997, entitled ELECTRONIC BATTERY TESTING DEVICE LOOSE TERMINAL CONNECTION DETECTION VIA A COMPARISON CIRCUIT; U.S. Pat. No. 5,598,098, issued Jan. 28, 1997, entitled ELECTRONIC BATTERY TESTER WITH VERY HIGH NOISE IMMUNITY; U.S. Pat. No. 5,656,920, issued Aug. 12, 1997, entitled METHOD FOR OPTIMIZING THE CHARGING LEAD-ACID BATTERIES AND AN INTERACTIVE CHARGER; U.S. Pat. No. 5,757,192, issued May 26, 1998, entitled METHOD AND APPARATUS FOR DETECTING A BAD CELL IN A STORAGE BATTERY; U.S. Pat. No. 5,821,756, issued Oct. 13, 1998, entitled ELECTRONIC BATTERY TESTER WITH TAILORED COMPENSATION FOR LOW STATE-OF-CHARGE; U.S. Pat. No. 5,831,435, issued Nov. 3, 1998, entitled BATTERY TESTER FOR JIS STANDARD; U.S. Pat. No. 5,914,605, issued Jun. 22, 1999, entitled ELECTRONIC BATTERY TESTER; U.S. Pat. No. 5,945,829, issued Aug. 31, 1999, entitled MIDPOINT BATTERY MONITORING; U.S. Pat. No. 6,002,238, issued Dec. 14, 1999, entitled METHOD AND APPARATUS FOR MEASURING COMPLEX IMPEDANCE OF CELLS AND BATTERIES; U.S. Pat. No. 6,037,751, issued Mar. 14, 2000, entitled APPARATUS FOR CHARGING BATTERIES; U.S. Pat. No. 6,037,777, issued Mar. 14, 2000, entitled METHOD AND APPARATUS FOR DETERMINING BATTERY PROPERTIES FROM COMPLEX IMPEDANCE/ADMITTANCE; U.S. Pat. No. 6,051,976, issued Apr. 18, 2000, entitled METHOD AND APPARATUS FOR AUDITING A BATTERY TEST; U.S. Pat. No. 6,081,098, issued Jun. 27, 2000, entitled METHOD AND APPARATUS FOR CHARGING A BATTERY; U.S. Pat. No. 6,091,245, issued Jul. 18, 2000, entitled METHOD AND APPARATUS FOR AUDITING A BATTERY TEST; U.S. Pat. No. 6,104,167, issued Aug. 15, 2000, entitled METHOD AND APPARATUS FOR CHARGING A BATTERY; U.S. Pat. No. 6,137,269, issued Oct. 24, 2000, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,163,156, issued Dec. 19, 2000, entitled ELECTRICAL CONNECTION FOR ELECTRONIC BATTERY TESTER; U.S. Pat. No. 6,172,483, issued Jan. 9, 2001, entitled METHOD AND APPARATUS FOR MEASURING COMPLEX IMPEDANCE OF CELL AND BATTERIES; U.S. Pat. No. 6,172,505, issued Jan. 9, 2001, entitled ELECTRONIC BATTERY TESTER; U.S. Pat. No. 6,222,369, issued Apr. 24, 2001, entitled METHOD AND APPARATUS FOR DETERMINING BATTERY PROPERTIES FROM COMPLEX IMPEDANCE/ADMITTANCE; U.S. Pat. No. 6,225,808, issued May 1, 2001, entitled TEST COUNTER FOR ELECTRONIC BATTERY TESTER; U.S. Pat. No. 6,249,124, issued Jun. 19, 2001, entitled ELECTRONIC BATTERY TESTER WITH INTERNAL BATTERY; U.S. Pat. No. 6,259,254, issued Jul. 10, 2001, entitled APPARATUS AND METHOD FOR CARRYING OUT DIAGNOSTIC TESTS ON BATTERIES AND FOR RAPIDLY CHARGING BATTERIES; U.S. Pat. No. 6,262,563, issued Jul. 17, 2001, entitled METHOD AND APPARATUS FOR MEASURING COMPLEX ADMITTANCE OF CELLS AND BATTERIES; U.S. Pat. No. 6,294,896, issued Sep. 25, 2001; entitled METHOD AND APPARATUS FOR MEASURING COMPLEX SELF-IMMITANCE OF A GENERAL ELECTRICAL ELEMENT; U.S. Pat. No. 6,294,897, issued Sep. 25, 2001, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,304,087, issued Oct. 16, 2001, entitled APPARATUS FOR CALIBRATING ELECTRONIC BATTERY TESTER; U.S. Pat. No. 6,310,481, issued Oct. 30, 2001, entitled ELECTRONIC BATTERY TESTER; U.S. Pat. No. 6,313,607, issued Nov. 6, 2001, entitled METHOD AND APPARATUS FOR EVALUATING STORED CHARGE IN AN ELECTROCHEMICAL CELL OR BATTERY; U.S. Pat. No. 6,313,608, issued Nov. 6, 2001, entitled METHOD AND APPARATUS FOR CHARGING A BATTERY; and U.S. Pat. No. 6,316,914, issued Nov. 13, 2001, entitled TESTING PARALLEL STRINGS OF STORAGE BATTERIES.

In the specific embodiment illustrated in FIG. 3, forcing function 60 is a function which applies a signal having an AC or transient component to battery 16. The forcing function can be through the application of a load which provides a desired forcing function in which current is drawn from battery 16, or can be through active circuitry in which a current is injected into battery 16. This results in a current labeled $I_F$ in FIG. 3. The total current, $I_T$ through battery 16 is due to both the forcing function current $I_F$ and the current flowing through loads 14, $I_L$. Current sensor 58 is positioned to sense the total current $I_T$. One example battery dynamic parameter, the dynamic conductance (ΔG), can be calculated as:

$$\Delta G = \Delta I_T / \Delta V \qquad \text{Equation 1}$$

where ΔV is the change in voltage measured across the battery 16 by voltage sensor 56 and $\Delta I_T$ is the change in total current measured flowing through battery 16 using current sensor 58. The forcing function 60 is provided in order to ensure that the current through battery 16 changes with time. However, in one embodiment, changes in $I_L$ due to loads 14 or the output from alternator 20 can be used alone such that $\Delta I_T = \Delta I_L$ and the forcing function 60 is not required.

A temperature sensor 66 is provided which can be coupled directly to one of the terminals of the battery 16 for measuring battery temperature. The temperature sensor 66 can be used in determining the condition of the battery, as battery condition is a function of temperature and can be used in estimating the amount of power which will be required to start the engine of the vehicle. Any type of temperature sensor can be used, for example, a thermistor, thermocouple, RTD, semiconductor or other temperature sensor.

In one embodiment, current sensor 58 comprises a resistance shunt of 250 μohms and current through the shunt is determined by measuring the voltage drop across the shunt. However, other types of current measurement techniques can also be used such as Hall Effect sensors or through an inductance probe. The change of voltage across the battery and the resultant change in current through the battery is sampled using, for example, one or more analog to digital converters. This information can be correlated to determine the total capacity, such as the total Cold Cranking Amp (CCA) capacity of the battery.

In general, the present invention uses the direct relationship between the dynamic conductance of the battery and the condition of the battery. For example, if a battery drops more than 15% below its rated capacity, microprocessor 54 can provide an output which indicates that the battery 16 should be replaced. Further, the conductance can be used to determine the charge level of the battery. Such a measurement can be augmented to improve accuracy by monitoring the total current flowing into battery 16, or out of battery 16, using current sensor 58. The voltage across the battery 16 can also be used to determine the charge used in the determination of charge level. In general, the state of charge can be determined as a function of various combinations either alone or together of battery state of health, temperature, charge balance (charge going into and out of the battery), charging efficiency and initial conditions such as the battery construction, manufacture, plate configuration or other conditions of the battery. The functional relationship can be determined by characterizing multiple batteries or through the use of artificial intelligence techniques such as neural networks. Particular examples for determining the state of health and state of charge of a battery utilizing a battery monitor, such as 52, are described and illustrated in U.S. Pat. No. 6,331,762, issued Dec. 18, 2001, and entitled ENERGY MANAGEMENT SYSTEM FOR AUTOMOTIVE VEHICLE which is incorporated herein by reference in its entirety.

Using the battery state of charge and the battery state of health, battery monitor 52 can predict the starting capabilities of a starter motor of vehicle 10. For example, by comparing the amount of current measured by current sensor 58 which has been previously been required to start the engine of vehicle 10 for a particular temperature, microprocessor 54 can determine if the current state of charge of the battery for the current state of health at the current temperature will be sufficient to provide enough current to start the engine. By determining the starting capability of the starter motor just after receiving a shutdown control signal from engine shutdown circuit 24, microprocessor 54 can provide a battery-condition signal to circuit 24. Based on the determined starting capability, circuit 24 will either shut down engine 18 or keep it running.

Figure 4:
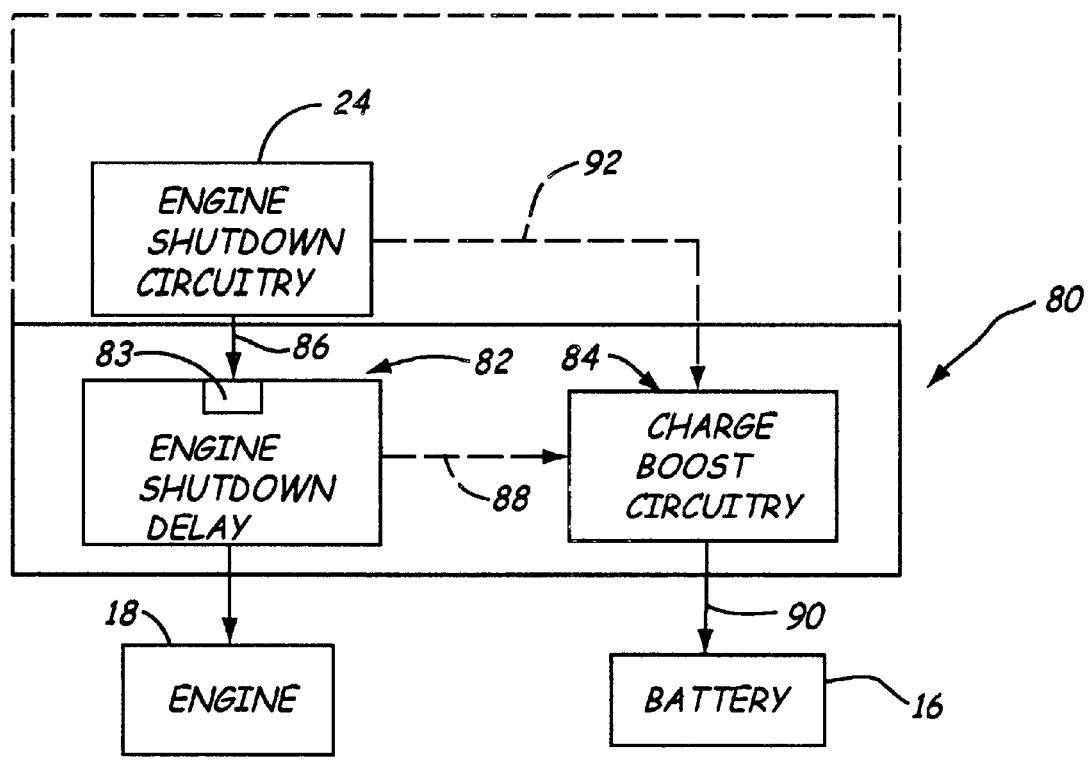
FIG. 4 illustrates a simplified block diagram showing a system for controlling the charging of a battery in a vehicle in accordance with another embodiment of the present invention.

FIG. 4 illustrates a simplified block diagram showing a system for controlling the charging of a battery in a vehicle in accordance with another embodiment of the present invention. Battery charge control system 80 includes, as its primary components, engine shutdown delay 82 and charge boost circuitry 84. Engine shutdown delay 82 may be a simple timing circuit, capable of providing a time delay, which is apparent to those skilled in the art. Engine shutdown delay 82 may also be a small microprocessor that is capable of implementing a time delay function. In some embodiments, engine shutdown delay 82 may be a part of engine shutdown circuit 24. In these embodiments, an engine shutdown delay function is implemented in controller 36 (FIG. 2) of engine shutdown circuit 24. Charge boost circuitry 84 can be any circuit configuration that is capable of increasing a charging signal applied to battery 16. Thus, charge boost circuitry 84 may be a part of alternator 20 (FIGS. 1 and 3) and may include a potentiometer electrically coupled to the field windings of the rotor of alternator 20. An adjustment of the potentiometer to decrease the resistance in the field winding circuit causes an increase in the field current, which causes a corresponding increase in the alternator output. This results in an increased charge signal provided to battery 16. In some embodiments, charge boost circuitry 84 may be part of battery monitor circuit 52 (FIG. 3).

In operation, upon determining that one or more engine stop conditions are fulfilled, engine shutdown circuit 24 provides an engine shutdown signal, via control line 86, to engine shutdown delay 82. The engine shut-down signal is received through input 83. Upon receiving the engine shutdown signal, engine shutdown delay 82 delays the shutdown of engine 18 for a predetermined period of time, which is typically relatively brief. During this delay period, engine shutdown delay 82 provides a charge control signal to charge boost circuitry 84 via control line 88. In response to receiving charge control signal from engine shutdown delay 82, charge boost circuitry 84 increases a charge signal that it supplies to battery 16 via electrical connection(s) 90. The charge signal is typically a charging voltage. At the end of the shutdown delay period, the application of the charge signal to battery 16 is terminated and engine 18 is shut down.

In some embodiments of the present invention, the charge control signal can be provided to charge boost circuitry 84 via optional control line 92 from engine shutdown circuitry 24, instead of from engine shutdown delay 82 via control line 88. In these embodiments, control line 88 could be optionally omitted. The various features set forth in FIG. 4 can be used in any appropriate combination to provide a boost charge to battery 16 just prior to shutdown of engine 18.

Figure 5:
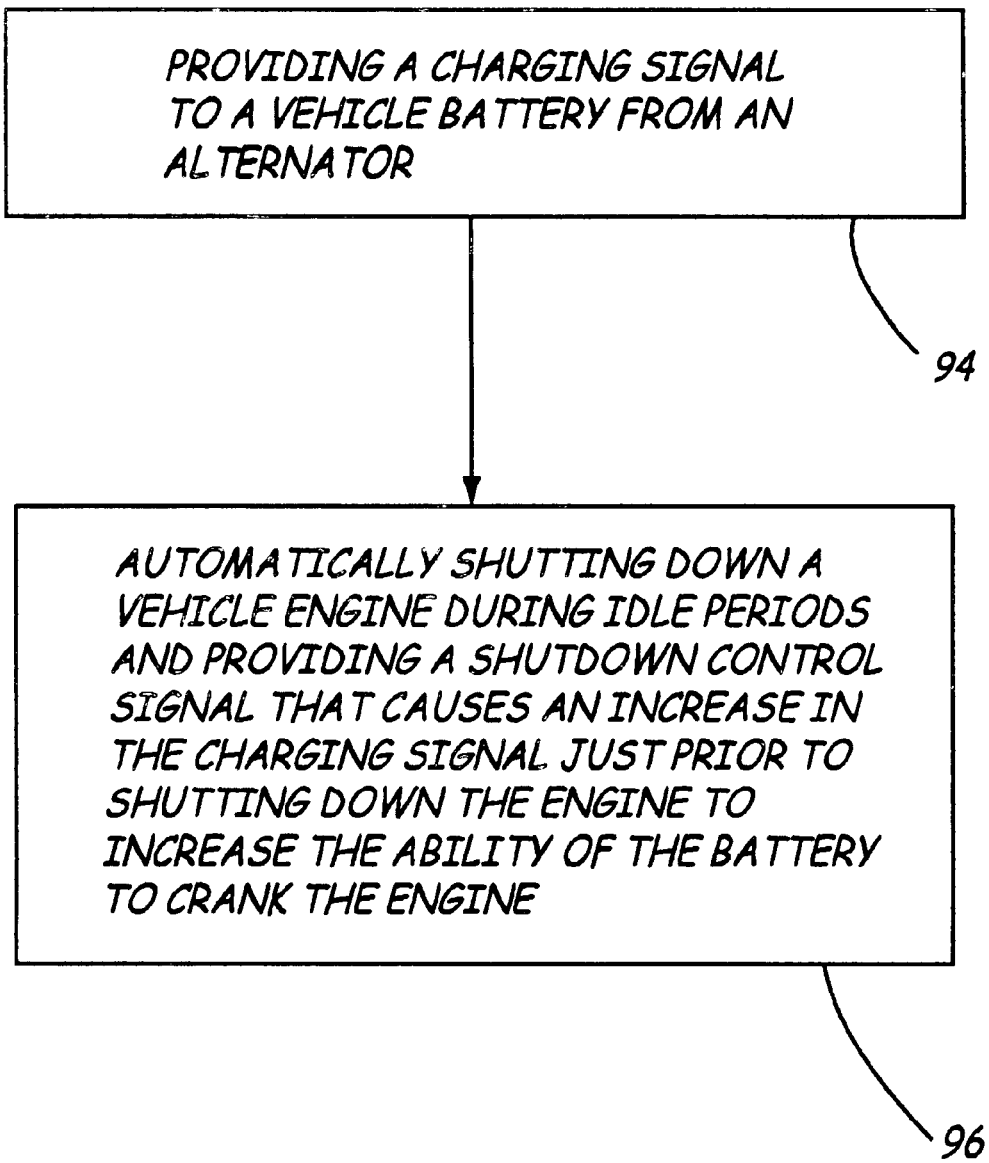
FIG. 5 is a flow chart representing a method of controlling the charging of a battery in a vehicle according to an illustrative embodiment of the present invention.

FIG. 5 is a flow chart representing a method of controlling charging of a battery in a vehicle having an internal combustion engine that drives an alternator according to an illustrative embodiment of the present invention. At step 94 a charging signal is provided to the battery from the alternator. At step 96, the engine is shut down automatically during idle periods and a shutdown control signal is provided, which causes an increase in the charging signal just prior to shutting down the engine to thereby increase the ability of the battery to crank the engine.

In embodiments of the present invention, the engine shutdown is carried out by an engine shutdown circuit, which also provides the shutdown control signal.

Although the present invention has been described with reference to preferred embodiments, workers skilled in the art will recognize that changes may be made in form and detail without departing from the spirit and scope of the invention. For example, the circuitry and circuit configurations are provided as particular embodiments and those skilled in the art will recognize that other configurations can be provided. The charging signal provided by alternator 20 can also be increased just prior to engine shutdown by increasing the speed of the alternator rotor. This can be carried out by automatic revving of engine 18 before shutdown.

What is claimed is:

1. An apparatus for controlling charging of a battery of a vehicle powered by an internal combustion engine comprising:

an input configured to receive an engine shutdown signal indicative that the engine will be shut down during an idle period to thereby conserve fuel;

an engine shutdown delay configured to delay shutdown of the engine for a shutdown delay period in response to the engine shutdown signal; and charge boost circuitry configured to increase a charge signal applied to the battery of the vehicle during the engine shutdown delay period, wherein the charge signal is increased independently of a load on the charge boost circuitry.

2. The apparatus of claim 1 wherein the charge boost circuitry increases the charge signal in response to a charge control signal provided by the engine shutdown delay.

3. The apparatus of claim 1 wherein the charge boost circuitry increases the charge signal in response to a charge control signal provided by the engine shutdown circuit.

4. The apparatus of claim 1 wherein the charge boost circuitry is part of an alternator of the vehicle.

5. The apparatus of claim 1 wherein the charge boost circuitry is a part of a battery monitor circuit.

6. The apparatus of claim 5 wherein the battery monitor circuit is coupled to the battery through a four point Kelvin connection.

7. The apparatus of claim 1 wherein the charge signal comprises a charging voltage.

8. The apparatus of claim 1 wherein the engine shutdown delay is part of an engine shutdown circuit.

9. The apparatus of claim 8 wherein the engine shutdown circuit comprises a vehicle speed sensor.

10. The apparatus of claim 8 wherein the engine shutdown circuit comprises an idle position switch.

11. The apparatus of claim 8 wherein the engine shutdown circuit is configured to receive a request to shut down the engine from a vehicle operator.

12. An apparatus for controlling charging of a battery of a vehicle powered by an internal combustion engine, comprising:
an alternator, driven by the engine, and electrically coupled to the battery, the alternator adapted to charge the battery with a charging signal; and
engine shutdown circuitry configured to automatically shut down the engine during idle periods and to provide a shutdown control signal that causes an increase the charging signal just prior to shutting down the engine to thereby increase the ability of the battery to crank the engine, wherein the charge signal is increased independently of a load on the alternator.

13. The apparatus of claim 12 further comprising a battery monitor circuit adapted to determine a condition of the battery as a function of a measured dynamic parameter and to provide an alternator control signal that controls the charging signal provided by the alternator, wherein the alternator control signal is a function of the shutdown control signal and the determined condition of the battery.

14. The apparatus of claim 13 wherein the battery monitor circuit is configured to send a battery-condition signal reflecting the determined condition of the battery to the engine shutdown circuitry, and wherein the engine shutdown circuitry is configured to shut down the engine as a function of the determined battery condition.

15. The apparatus of claim 13 wherein the battery monitor circuit is coupled to the battery through a four point Kelvin connection.

16. The apparatus of claim 12 wherein the charging signal is increased by controlling a regulator of the alternator.

17. The apparatus of claim 12 wherein the charging signal comprises a charging voltage.

18. The apparatus of claim 12 wherein the engine shutdown circuitry is configured to determine that the engine is idle when the vehicle has a speed of zero miles per hour and the vehicle is not being accelerated.

19. The apparatus of claim 12 wherein the engine shutdown circuitry comprises a vehicle speed sensor.

20. The apparatus of claim 12 wherein the engine shutdown circuitry comprises an idle position switch.

21. The apparatus of claim 12 wherein the charging signal is increased by revving the engine.

22. The apparatus of claim 12 wherein the engine shutdown circuitry is configured to receive a request to shut down the engine from a vehicle operator.

23. An apparatus for controlling charging of a battery of a vehicle, comprising:
an internal combustion engine configured to power the vehicle;
an alternator, driven by the engine, and electrically coupled to the battery, the alternator adapted to charge the battery with a charging signal; and
engine shutdown circuitry configured to automatically shut down the engine during idle periods and to provide a shutdown control signal that causes an increase the charging signal just prior to shutting down the engine to thereby increase the ability of the battery to crank the engine.

24. The apparatus of claim 23 further comprising a battery monitor circuit adapted to determine a condition of the battery as a function of a measured dynamic parameter and to provide an alternator control signal that controls the charging signal provided by the alternator, wherein the alternator control signal is a function of the shutdown control signal and the determined condition of the battery.

25. The apparatus of claim 24 wherein the battery monitor circuit is configured to send a battery-condition signal reflecting the determined condition of the battery to the engine shutdown circuitry, and wherein the engine shutdown circuitry is configured to shut down the engine as a function of the determined battery condition.

26. The apparatus of claim 24 wherein the battery monitor circuit is coupled to the battery through a four point Kelvin connection.

27. The apparatus of claim 23 wherein the charging signal is increased by controlling a regulator of the alternator.

28. The apparatus of claim 23 wherein the charging signal comprises a charging voltage.

29. The apparatus of claim 23 wherein the engine shutdown circuitry is configured to determine that the engine is idle when the vehicle has a speed of zero miles per hour and the vehicle is not being accelerated.

30. The apparatus of claim 23 wherein the engine shutdown circuitry comprises a vehicle speed sensor.

31. The apparatus of claim 23 wherein the engine shutdown circuitry comprises an idle position switch.

32. The apparatus of claim 23 wherein the charging signal is increased by revving the engine.

33. The apparatus of claim 23 wherein the engine shutdown circuitry is configured to receive a request to shut down the engine from a vehicle operator.

34. A method of controlling charging of a battery in a vehicle having an internal combustion engine that drives an alternator, comprising:
providing a charging signal to the battery from the alternator; and
automatically shutting down the engine during idle periods and providing a shutdown control signal that causes an increase in the charging signal just prior to shutting down the engine to thereby increase the ability of the battery to crank the engine.

35. The method of claim 34 further comprising determining a condition of the battery as a function of a measured dynamic parameter and providing an alternator control signal that controls the charging signal provided by the alternator, wherein the alternator control signal is a function of the shutdown control signal and the determined condition of the battery.

36. The method of claim 35 further comprising shutting down the engine based on the determined battery condition.

37. The method of claim 35 further comprising coupling to the battery through a four point Kelvin connection.

38. The method of claim 34 wherein the charging signal is increased by controlling a regulator of the alternator.

39. The method of claim 34 wherein the charging signal comprises a charging voltage.

40. The method of claim 34 further comprising determining that the engine is idle when the vehicle has a speed of zero miles per hour and the vehicle is not being accelerated.

41. The method of claim 34 wherein the charging signal is increased by revving the engine.

42. The method of claim 34 further comprising receiving a request to shut down the engine from a vehicle operator.

* * * * *